(12) United States Patent
Bailey et al.

(10) Patent No.: US 11,514,021 B2
(45) Date of Patent: Nov. 29, 2022

(54) SYSTEMS, METHODS, AND APPARATUSES FOR SCANNING A LEGACY DATABASE

(71) Applicant: CDK GLOBAL, LLC, Hoffman Estates, IL (US)

(72) Inventors: Bruce Bailey, Portland, OR (US); Mark Helzer, Portland, OR (US)

(73) Assignee: CDK GLOBAL, LLC, Hoffman Estates, IL (US)

( * ) Notice: Subject to any disclaimer, the term of this patent is extended or adjusted under 35 U.S.C. 154(b) by 11 days.

(21) Appl. No.: 17/156,254

(22) Filed: Jan. 22, 2021

(65) Prior Publication Data

US 2022/0237171 A1    Jul. 28, 2022

(51) Int. Cl.
*G06F 16/00* (2019.01)
*G06F 16/23* (2019.01)
*G06F 16/25* (2019.01)
*G06F 16/21* (2019.01)
*G06F 16/28* (2019.01)

(52) U.S. Cl.
CPC ........ *G06F 16/2358* (2019.01); *G06F 16/219* (2019.01); *G06F 16/2322* (2019.01); *G06F 16/25* (2019.01); *G06F 16/289* (2019.01)

(58) Field of Classification Search
CPC ......... H04L 45/02; H04L 45/04; H04L 45/48; H04L 49/15
See application file for complete search history.

(56) References Cited

U.S. PATENT DOCUMENTS

| | | |
|---|---|---|
| 3,792,445 A | 2/1974 | Bucks et al. |
| 4,258,421 A | 3/1981 | Juhasz et al. |
| 4,992,940 A | 2/1991 | Dworkin |
| 5,003,476 A | 3/1991 | Abe |
| 5,034,889 A | 7/1991 | Abe |
| 5,058,044 A | 10/1991 | Stewart et al. |
| 5,421,015 A | 5/1995 | Khoyi et al. |
| 5,442,553 A | 8/1995 | Parrillo |
| 5,452,446 A | 9/1995 | Johnson |
| 5,521,815 A | 5/1996 | Rose, Jr. |
| 5,649,186 A | 7/1997 | Ferguson |
| 5,694,595 A | 12/1997 | Jacobs et al. |
| 5,729,452 A | 3/1998 | Smith et al. |

(Continued)

FOREIGN PATENT DOCUMENTS

| | | |
|---|---|---|
| CA | 2494350 | 5/2004 |
| EP | 0461888 | 3/1995 |
| WO | 2007002759 | 1/2007 |

OTHER PUBLICATIONS

U.S. Appl. No. 10/665,899, Non-Final Office Action, dated Aug. 30, 2010, 23 pages.

(Continued)

*Primary Examiner* — Anhtai V Tran
(74) *Attorney, Agent, or Firm* — Stoel Rives LLP

(57) ABSTRACT

Embodiments herein relate to replacing a legacy Pick environment with a modern microservice architecture. A legacy database and a modern database may be operated in parallel for data validation. Part of the data validation may include scanning the legacy database for updates to items stored thereon. Embodiments herein may generate an update message by combining item keys from across the multiple files that correspond with a same business object.

20 Claims, 4 Drawing Sheets

(56) References Cited

U.S. PATENT DOCUMENTS

| | | |
|---|---|---|
| 5,764,943 A | 6/1998 | Wechsler |
| 5,787,177 A | 7/1998 | Leppek |
| 5,790,785 A | 8/1998 | Klug et al. |
| 5,835,712 A | 11/1998 | Dufresne |
| 5,845,299 A | 12/1998 | Arora et al. |
| 5,862,346 A | 1/1999 | Kley et al. |
| 5,911,145 A | 6/1999 | Arora et al. |
| 5,956,720 A | 9/1999 | Fernandez et al. |
| 5,974,149 A | 10/1999 | Leppek |
| 5,974,418 A | 10/1999 | Blinn et al. |
| 5,974,428 A | 10/1999 | Gerard et al. |
| 5,978,776 A | 11/1999 | Seretti et al. |
| 5,987,506 A | 11/1999 | Carter et al. |
| 6,003,635 A | 12/1999 | Bantz et al. |
| 6,006,201 A | 12/1999 | Berent et al. |
| 6,009,410 A | 12/1999 | Lemole et al. |
| 6,018,748 A | 1/2000 | Smith |
| 6,021,416 A | 2/2000 | Dauerer et al. |
| 6,021,426 A | 2/2000 | Douglis et al. |
| 6,026,433 A | 2/2000 | D'Arlach et al. |
| 6,041,310 A | 3/2000 | Green et al. |
| 6,041,344 A | 3/2000 | Bodamer et al. |
| 6,055,541 A | 4/2000 | Solecki et al. |
| 6,061,698 A | 5/2000 | Chadha et al. |
| 6,067,559 A | 5/2000 | Allard et al. |
| 6,070,164 A | 5/2000 | Vagnozzi |
| 6,134,532 A | 10/2000 | Lazarus et al. |
| 6,151,609 A | 11/2000 | Truong |
| 6,178,432 B1 | 1/2001 | Cook et al. |
| 6,181,994 B1 | 1/2001 | Colson et al. |
| 6,185,614 B1 | 2/2001 | Cuomo et al. |
| 6,189,104 B1 | 2/2001 | Leppek |
| 6,216,129 B1 | 4/2001 | Eldering |
| 6,219,667 B1 | 4/2001 | Lu et al. |
| 6,236,994 B1 | 5/2001 | Schwartz et al. |
| 6,240,365 B1 | 5/2001 | Bunn |
| 6,263,268 B1 | 7/2001 | Nathanson |
| 6,285,932 B1 | 9/2001 | De Belledeuille et al. |
| 6,289,382 B1 | 9/2001 | Bowman-Amuah |
| 6,295,061 B1 | 9/2001 | Park et al. |
| 6,330,499 B1 | 12/2001 | Chou et al. |
| 6,343,302 B1 | 1/2002 | Graham |
| 6,353,824 B1 | 3/2002 | Boguraev et al. |
| 6,356,822 B1 | 3/2002 | Diaz et al. |
| 6,374,241 B1 | 4/2002 | Lamburt et al. |
| 6,397,226 B1 | 5/2002 | Sage |
| 6,397,336 B2 | 5/2002 | Leppek |
| 6,401,103 B1 | 6/2002 | Ho et al. |
| 6,421,733 B1 | 7/2002 | Tso et al. |
| 6,473,849 B1 | 10/2002 | Keller et al. |
| 6,496,855 B1 | 12/2002 | Hunt et al. |
| 6,505,106 B1 | 1/2003 | Lawrence et al. |
| 6,505,205 B1 | 1/2003 | Kothuri et al. |
| 6,519,617 B1 | 2/2003 | Wanderski et al. |
| 6,529,948 B1 * | 3/2003 | Bowman-Amuah ........ G06F 9/4493 709/217 |
| 6,535,879 B1 | 3/2003 | Behera |
| 6,539,370 B1 | 3/2003 | Chang et al. |
| 6,546,216 B2 | 4/2003 | Mizoguchi et al. |
| 6,553,373 B2 | 4/2003 | Boguraev et al. |
| 6,556,904 B1 | 4/2003 | Larson et al. |
| 6,564,216 B2 | 5/2003 | Waters |
| 6,571,253 B1 | 5/2003 | Thompson et al. |
| 6,581,061 B2 | 6/2003 | Graham |
| 6,583,794 B1 | 6/2003 | Wattenberg |
| 6,594,664 B1 | 7/2003 | Estrada et al. |
| 6,606,525 B1 | 8/2003 | Muthuswamy et al. |
| 6,629,148 B1 | 9/2003 | Ahmed et al. |
| 6,640,244 B1 * | 10/2003 | Bowman-Amuah ... G06F 9/466 707/999.01 |
| 6,643,663 B1 | 11/2003 | Dabney et al. |
| 6,654,726 B1 | 11/2003 | Hanzek |
| 6,678,706 B1 | 1/2004 | Fishel |
| 6,697,825 B1 | 2/2004 | Underwood et al. |
| 6,701,232 B2 | 3/2004 | Yamaki |
| 6,721,747 B2 | 4/2004 | Lipkin |
| 6,728,685 B1 | 4/2004 | Ahluwalia |
| 6,738,750 B2 | 5/2004 | Stone et al. |
| 6,744,735 B1 | 6/2004 | Nakaguro |
| 6,748,305 B1 | 6/2004 | Klausner et al. |
| 6,785,864 B1 | 8/2004 | Te et al. |
| 6,795,819 B2 | 9/2004 | Wheeler et al. |
| 6,823,258 B2 | 11/2004 | Ukai et al. |
| 6,823,359 B1 | 11/2004 | Heidingsfeld |
| 6,826,594 B1 | 11/2004 | Pettersen |
| 6,847,988 B2 | 1/2005 | Toyouchi et al. |
| 6,850,823 B2 | 2/2005 | Eun et al. |
| 6,871,216 B2 | 3/2005 | Miller et al. |
| 6,901,430 B1 | 3/2005 | Smith |
| 6,894,601 B1 | 5/2005 | Grunden et al. |
| 6,917,941 B2 | 7/2005 | Wight et al. |
| 6,922,674 B1 | 7/2005 | Nelson |
| 6,941,203 B2 | 9/2005 | Chen |
| 6,944,677 B1 | 9/2005 | Zhao |
| 6,954,731 B1 | 10/2005 | Montague et al. |
| 6,963,854 B1 | 11/2005 | Boyd et al. |
| 6,965,806 B2 | 11/2005 | Eryurek et al. |
| 6,965,968 B1 | 11/2005 | Touboul |
| 6,978,273 B1 | 12/2005 | Bonneau et al. |
| 6,981,028 B1 | 12/2005 | Rawat et al. |
| 6,990,629 B1 | 1/2006 | Heaney et al. |
| 6,993,421 B2 | 1/2006 | Pillar |
| 7,000,184 B2 | 2/2006 | Matveyenko et al. |
| 7,003,476 B1 | 2/2006 | Samra et al. |
| 7,010,495 B1 | 3/2006 | Samra et al. |
| 7,028,072 B1 | 4/2006 | Kliger et al. |
| 7,031,554 B2 | 4/2006 | Iwane |
| 7,039,704 B2 | 5/2006 | Davis et al. |
| 7,047,318 B1 | 5/2006 | Svedloff |
| 7,062,343 B2 | 6/2006 | Ogushi et al. |
| 7,062,506 B2 | 6/2006 | Taylor et al. |
| 7,072,943 B2 | 7/2006 | Landesmann |
| 7,092,803 B2 | 8/2006 | Kapolka et al. |
| 7,107,268 B1 | 9/2006 | Zawadzki et al. |
| 7,124,116 B2 | 10/2006 | Huyler |
| 7,152,207 B1 | 12/2006 | Underwood et al. |
| 7,155,491 B1 | 12/2006 | Schultz et al. |
| 7,171,418 B2 | 1/2007 | Blessin |
| 7,184,866 B2 | 2/2007 | Squires et al. |
| 7,197,764 B2 | 3/2007 | Cichowlas |
| 7,219,234 B1 | 5/2007 | Ashland et al. |
| 7,240,125 B2 | 7/2007 | Fleming |
| 7,246,263 B2 | 7/2007 | Skingle |
| 7,281,029 B2 | 10/2007 | Rawat |
| 7,287,000 B2 | 10/2007 | Boyd et al. |
| 7,322,007 B2 | 1/2008 | Schowtka et al. |
| 7,386,786 B2 | 6/2008 | Davis et al. |
| 7,401,289 B2 | 7/2008 | Lachhwani et al. |
| 7,406,429 B2 | 7/2008 | Salonen |
| 7,433,891 B2 | 10/2008 | Haber et al. |
| 7,457,693 B2 | 11/2008 | Olsen et al. |
| 7,477,968 B1 | 1/2009 | Lowrey |
| 7,480,551 B1 | 1/2009 | Lowrey et al. |
| 7,496,543 B1 | 2/2009 | Bamford et al. |
| 7,502,672 B1 | 3/2009 | Kolls |
| 7,536,641 B2 | 5/2009 | Rosenstein et al. |
| 7,548,985 B2 | 6/2009 | Guigui |
| 7,587,504 B2 | 9/2009 | Adams et al. |
| 7,590,476 B2 | 9/2009 | Shumate |
| 7,593,925 B2 | 9/2009 | Cadiz et al. |
| 7,593,999 B2 | 9/2009 | Nathanson |
| 7,613,627 B2 | 11/2009 | Doyle et al. |
| 7,620,484 B1 | 11/2009 | Chen |
| 7,624,342 B2 | 11/2009 | Matveyenko et al. |
| 7,657,594 B2 | 2/2010 | Banga et al. |
| 7,664,667 B2 | 2/2010 | Ruppelt et al. |
| 7,739,007 B2 | 6/2010 | Logsdon |
| 7,747,680 B2 | 6/2010 | Ravikumar et al. |
| 7,778,841 B1 | 8/2010 | Bayer et al. |
| 7,801,945 B1 | 9/2010 | Geddes et al. |
| 7,818,380 B2 | 10/2010 | Tamura et al. |
| 7,861,309 B2 | 12/2010 | Spearman et al. |
| 7,865,409 B1 | 1/2011 | Monaghan |

(56) References Cited

U.S. PATENT DOCUMENTS

| | | |
|---|---|---|
| 7,870,253 B2 | 1/2011 | Muilenburg et al. |
| 7,899,701 B1 | 3/2011 | Odom |
| 7,908,051 B2 | 3/2011 | Oesterling |
| 7,979,506 B2 | 7/2011 | Cole |
| 8,010,423 B2 | 8/2011 | Bodin et al. |
| 8,019,501 B2 | 9/2011 | Breed |
| 8,036,788 B2 | 10/2011 | Breed |
| 8,051,159 B2 | 11/2011 | Muilenburg et al. |
| 8,055,544 B2 | 11/2011 | Ullman et al. |
| 8,060,274 B2 | 11/2011 | Boss et al. |
| 8,095,403 B2 | 1/2012 | Price |
| 8,099,308 B2 | 1/2012 | Uyeki |
| 8,135,804 B2 | 3/2012 | Uyeki |
| 8,145,379 B2 | 3/2012 | Schwinke |
| 8,190,322 B2 | 5/2012 | Lin et al. |
| 8,209,259 B2 | 6/2012 | Graham, Jr. et al. |
| 8,212,667 B2 | 7/2012 | Petite et al. |
| 8,271,473 B2 | 9/2012 | Berg |
| 8,271,547 B2 | 9/2012 | Taylor et al. |
| 8,275,717 B2 | 9/2012 | Ullman et al. |
| 8,285,439 B2 | 10/2012 | Hodges |
| 8,296,007 B2 | 10/2012 | Swaminathan et al. |
| 8,311,905 B1 | 11/2012 | Campbell et al. |
| 8,355,950 B2 | 1/2013 | Colson et al. |
| 8,407,664 B2 | 3/2013 | Moosmann et al. |
| 8,428,815 B2 | 4/2013 | Van Engelshoven et al. |
| 8,438,310 B2 | 5/2013 | Muilenburg et al. |
| 8,448,057 B1 | 5/2013 | Sugnet |
| 8,521,654 B2 | 8/2013 | Ford et al. |
| 8,538,894 B2 | 9/2013 | Ullman et al. |
| 8,645,193 B2 | 2/2014 | Swinson et al. |
| 8,676,638 B1 | 3/2014 | Blair et al. |
| 8,725,341 B2 | 5/2014 | Ogasawara |
| 8,745,641 B1 | 6/2014 | Coker |
| 8,849,689 B1 | 9/2014 | Jagannathan et al. |
| 8,886,389 B2 | 11/2014 | Edwards et al. |
| 8,924,071 B2 | 12/2014 | Stanek et al. |
| 8,954,222 B2 | 2/2015 | Costantino |
| 8,996,230 B2 | 3/2015 | Lorenz et al. |
| 8,996,235 B2 | 3/2015 | Singh et al. |
| 9,014,908 B2 | 4/2015 | Chen et al. |
| 9,015,059 B2 | 4/2015 | Sims et al. |
| 9,026,304 B2 | 5/2015 | Olsen, III et al. |
| 9,047,722 B2 | 6/2015 | Kurnik et al. |
| 9,165,413 B2 | 10/2015 | Jones et al. |
| 9,183,681 B2 | 11/2015 | Fish |
| 9,325,650 B2 | 4/2016 | Yalavarty et al. |
| 9,349,223 B1 | 5/2016 | Palmer |
| 9,384,597 B2 | 7/2016 | Koch et al. |
| 9,477,936 B2 | 10/2016 | Lawson et al. |
| 9,577,866 B2 | 2/2017 | Rogers et al. |
| 9,596,287 B2 | 3/2017 | Rybak et al. |
| 9,619,945 B2 | 4/2017 | Adderly et al. |
| 9,659,495 B2 | 5/2017 | Modica et al. |
| 9,706,008 B2 | 7/2017 | Rajan et al. |
| 9,715,665 B2 | 7/2017 | Schondorf et al. |
| 9,754,304 B2 | 9/2017 | Taira et al. |
| 9,778,045 B2 | 10/2017 | Bang |
| 9,836,714 B2 | 12/2017 | Lander et al. |
| 10,032,139 B2 | 7/2018 | Adderly et al. |
| 10,083,411 B2 | 9/2018 | Kinsey et al. |
| 10,169,607 B1 | 1/2019 | Sheth et al. |
| 10,229,394 B1 | 3/2019 | Davis et al. |
| 10,448,120 B1 | 10/2019 | Bursztyn et al. |
| 10,475,256 B2 | 11/2019 | Chowdhury et al. |
| 10,541,938 B1 * | 1/2020 | Timmerman ......... H04L 43/065 |
| 10,552,871 B1 | 2/2020 | Chadwick |
| 11,117,253 B2 | 9/2021 | Oleynik |
| 2001/0005831 A1 | 6/2001 | Lewin et al. |
| 2001/0014868 A1 | 8/2001 | Herz et al. |
| 2001/0037332 A1 | 11/2001 | Miller et al. |
| 2001/0039594 A1 | 11/2001 | Park et al. |
| 2001/0054049 A1 | 12/2001 | Maeda et al. |
| 2002/0023111 A1 | 2/2002 | Arora et al. |
| 2002/0024537 A1 | 2/2002 | Jones et al. |
| 2002/0026359 A1 | 2/2002 | Long et al. |
| 2002/0032626 A1 | 3/2002 | Dewolf et al. |
| 2002/0032701 A1 | 3/2002 | Gao et al. |
| 2002/0042738 A1 | 4/2002 | Srinivasan et al. |
| 2002/0046245 A1 | 4/2002 | Hillar et al. |
| 2002/0049831 A1 | 4/2002 | Platner et al. |
| 2002/0052778 A1 | 5/2002 | Murphy et al. |
| 2002/0059260 A1 | 5/2002 | Jas |
| 2002/0065698 A1 | 5/2002 | Schick et al. |
| 2002/0065739 A1 | 5/2002 | Florance et al. |
| 2002/0069110 A1 | 6/2002 | Sonnenberg |
| 2002/0073080 A1 | 6/2002 | Lipkin |
| 2002/0082978 A1 | 6/2002 | Ghouri et al. |
| 2002/0091755 A1 | 7/2002 | Narin |
| 2002/0107739 A1 | 8/2002 | Schlee |
| 2002/0111727 A1 | 8/2002 | Vanstory et al. |
| 2002/0111844 A1 | 8/2002 | Vanstory et al. |
| 2002/0116418 A1 | 8/2002 | Lachhwani et al. |
| 2002/0123359 A1 | 9/2002 | Wei et al. |
| 2002/0124053 A1 | 9/2002 | Adams et al. |
| 2002/0128728 A1 | 9/2002 | Murakami et al. |
| 2002/0129054 A1 | 9/2002 | Ferguson et al. |
| 2002/0133273 A1 | 9/2002 | Lowrey et al. |
| 2002/0138331 A1 | 9/2002 | Hosea et al. |
| 2002/0143646 A1 | 10/2002 | Boyden et al. |
| 2002/0154146 A1 | 10/2002 | Rodriquez et al. |
| 2002/0169851 A1 | 11/2002 | Weathersby et al. |
| 2002/0173885 A1 | 11/2002 | Lowrey et al. |
| 2002/0188869 A1 | 12/2002 | Patrick |
| 2002/0196273 A1 | 12/2002 | Krause |
| 2002/0198761 A1 | 12/2002 | Ryan et al. |
| 2002/0198878 A1 | 12/2002 | Baxter et al. |
| 2003/0014443 A1 | 1/2003 | Bernstein et al. |
| 2003/0023632 A1 | 1/2003 | Ries et al. |
| 2003/0033378 A1 | 2/2003 | Needham et al. |
| 2003/0036832 A1 | 2/2003 | Kokes et al. |
| 2003/0036964 A1 | 2/2003 | Boyden et al. |
| 2003/0037263 A1 | 2/2003 | Kamat et al. |
| 2003/0046179 A1 | 3/2003 | Anabtawi et al. |
| 2003/0051022 A1 | 3/2003 | Sogabe et al. |
| 2003/0055666 A1 | 3/2003 | Roddy et al. |
| 2003/0061263 A1 | 3/2003 | Riddle |
| 2003/0065532 A1 | 4/2003 | Takaoka |
| 2003/0065583 A1 | 4/2003 | Takaoka |
| 2003/0069785 A1 | 4/2003 | Lohse |
| 2003/0069790 A1 | 4/2003 | Kane |
| 2003/0074392 A1 | 4/2003 | Campbell et al. |
| 2003/0095038 A1 | 5/2003 | Dix |
| 2003/0101262 A1 | 5/2003 | Godwin |
| 2003/0115292 A1 | 6/2003 | Griffin et al. |
| 2003/0120502 A1 | 6/2003 | Robb et al. |
| 2003/0145310 A1 | 7/2003 | Thames et al. |
| 2003/0177050 A1 | 9/2003 | Crampton et al. |
| 2003/0177175 A1 | 9/2003 | Worley et al. |
| 2003/0225853 A1 | 12/2003 | Wang et al. |
| 2003/0229623 A1 | 12/2003 | Chang et al. |
| 2003/0233246 A1 | 12/2003 | Snapp et al. |
| 2004/0012631 A1 | 1/2004 | Skorski |
| 2004/0039646 A1 | 2/2004 | Hacker |
| 2004/0041818 A1 | 3/2004 | White et al. |
| 2004/0073546 A1 | 4/2004 | Forster et al. |
| 2004/0073564 A1 | 4/2004 | Haber et al. |
| 2004/0088228 A1 | 5/2004 | Mercer et al. |
| 2004/0093243 A1 | 5/2004 | Bodin et al. |
| 2004/0117046 A1 | 6/2004 | Colle et al. |
| 2004/0122735 A1 | 6/2004 | Meshkin et al. |
| 2004/0128320 A1 | 7/2004 | Grove et al. |
| 2004/0139203 A1 | 7/2004 | Graham, Jr. et al. |
| 2004/0148342 A1 | 7/2004 | Cotte |
| 2004/0156020 A1 | 8/2004 | Edwards |
| 2004/0163047 A1 | 8/2004 | Nagahara et al. |
| 2004/0181464 A1 | 9/2004 | Vanker et al. |
| 2004/0199413 A1 | 10/2004 | Hauser et al. |
| 2004/0220863 A1 | 11/2004 | Porter et al. |
| 2004/0225664 A1 | 11/2004 | Casement |
| 2004/0230897 A1 | 11/2004 | Latzel |
| 2004/0255233 A1 | 12/2004 | Croney et al. |
| 2004/0267263 A1 | 12/2004 | May |
| 2004/0268225 A1 | 12/2004 | Walsh et al. |

(56) References Cited

U.S. PATENT DOCUMENTS

| | | |
|---|---|---|
| 2004/0268232 A1 | 12/2004 | Tunning |
| 2005/0015491 A1 | 1/2005 | Koeppel |
| 2005/0021197 A1 | 1/2005 | Zimmerman et al. |
| 2005/0027611 A1 | 2/2005 | Wharton |
| 2005/0065804 A1 | 3/2005 | Worsham et al. |
| 2005/0096963 A1 | 5/2005 | Myr et al. |
| 2005/0108112 A1 | 5/2005 | Ellenson et al. |
| 2005/0108637 A1* | 5/2005 | Sahota ............... H04N 21/8586 715/239 |
| 2005/0114270 A1 | 5/2005 | Hind et al. |
| 2005/0114764 A1 | 5/2005 | Gudenkauf et al. |
| 2005/0149398 A1 | 7/2005 | McKay |
| 2005/0171836 A1 | 8/2005 | Leacy |
| 2005/0176482 A1 | 8/2005 | Raisinghani et al. |
| 2005/0187834 A1 | 8/2005 | Painter et al. |
| 2005/0198121 A1 | 9/2005 | Daniels et al. |
| 2005/0228736 A1 | 10/2005 | Norman et al. |
| 2005/0256755 A1 | 11/2005 | Chand et al. |
| 2005/0267774 A1 | 12/2005 | Merritt et al. |
| 2005/0268282 A1 | 12/2005 | Laird |
| 2005/0289020 A1 | 12/2005 | Bruns et al. |
| 2005/0289599 A1 | 12/2005 | Matsuura et al. |
| 2006/0031811 A1 | 2/2006 | Ernst et al. |
| 2006/0059253 A1 | 3/2006 | Goodman et al. |
| 2006/0064637 A1 | 3/2006 | Rechterman et al. |
| 2006/0123330 A1 | 6/2006 | Horiuchi et al. |
| 2006/0129423 A1 | 6/2006 | Sheinson et al. |
| 2006/0129982 A1 | 6/2006 | Doyle |
| 2006/0136105 A1 | 6/2006 | Larson |
| 2006/0161841 A1 | 7/2006 | Horiuchi et al. |
| 2006/0200751 A1 | 9/2006 | Underwood et al. |
| 2006/0224447 A1 | 10/2006 | Koningstein |
| 2006/0248442 A1 | 11/2006 | Rosenstein et al. |
| 2006/0265355 A1 | 11/2006 | Taylor |
| 2006/0271844 A1 | 11/2006 | Suklikar |
| 2006/0277588 A1 | 12/2006 | Harrington et al. |
| 2006/0282328 A1 | 12/2006 | Gerace et al. |
| 2006/0282547 A1* | 12/2006 | Hasha .................... H04L 45/02 709/251 |
| 2007/0005446 A1 | 1/2007 | Fusz et al. |
| 2007/0016486 A1 | 1/2007 | Stone et al. |
| 2007/0027754 A1 | 2/2007 | Collins et al. |
| 2007/0033087 A1 | 2/2007 | Combs et al. |
| 2007/0033520 A1 | 2/2007 | Kimzey et al. |
| 2007/0053513 A1 | 3/2007 | Hoffberg |
| 2007/0100519 A1 | 5/2007 | Engel |
| 2007/0150368 A1 | 6/2007 | Arora et al. |
| 2007/0209011 A1 | 9/2007 | Padmanabhuni et al. |
| 2007/0226540 A1 | 9/2007 | Konieczny |
| 2007/0250229 A1 | 10/2007 | Wu |
| 2007/0250327 A1 | 10/2007 | Hedy |
| 2007/0250840 A1 | 10/2007 | Coker et al. |
| 2007/0271154 A1 | 11/2007 | Broudy et al. |
| 2007/0271330 A1 | 11/2007 | Mattox et al. |
| 2007/0271389 A1 | 11/2007 | Joshi et al. |
| 2007/0282711 A1 | 12/2007 | Ullman et al. |
| 2007/0282712 A1 | 12/2007 | Ullman et al. |
| 2007/0282713 A1 | 12/2007 | Ullman et al. |
| 2007/0288413 A1 | 12/2007 | Mizuno et al. |
| 2007/0294192 A1 | 12/2007 | Tellefsen |
| 2008/0010561 A1 | 1/2008 | Bay et al. |
| 2008/0015921 A1 | 1/2008 | Libman |
| 2008/0015929 A1 | 1/2008 | Koeppel et al. |
| 2008/0027827 A1 | 1/2008 | Eglen et al. |
| 2008/0119983 A1 | 5/2008 | Inbarajan et al. |
| 2008/0172632 A1 | 7/2008 | Stambaugh |
| 2008/0189143 A1 | 8/2008 | Wurster |
| 2008/0195435 A1 | 8/2008 | Bentley et al. |
| 2008/0195932 A1 | 8/2008 | Oikawa et al. |
| 2008/0201163 A1 | 8/2008 | Barker et al. |
| 2008/0255925 A1 | 10/2008 | Vailaya et al. |
| 2009/0012887 A1 | 1/2009 | Taub et al. |
| 2009/0024918 A1 | 1/2009 | Silverbrook et al. |
| 2009/0043780 A1 | 2/2009 | Hentrich, Jr. et al. |
| 2009/0070435 A1 | 3/2009 | Abhyanker |
| 2009/0089134 A1 | 4/2009 | Uyeki |
| 2009/0106036 A1 | 4/2009 | Tamura et al. |
| 2009/0112687 A1 | 4/2009 | Blair et al. |
| 2009/0138329 A1 | 5/2009 | Wanker |
| 2009/0182232 A1 | 7/2009 | Zhang et al. |
| 2009/0187513 A1 | 7/2009 | Noy et al. |
| 2009/0187939 A1 | 7/2009 | Lajoie |
| 2009/0198507 A1 | 8/2009 | Rhodus |
| 2009/0204454 A1 | 8/2009 | Lagudi |
| 2009/0204655 A1 | 8/2009 | Wendelberger |
| 2009/0222532 A1 | 9/2009 | Finlaw |
| 2009/0265607 A1 | 10/2009 | Raz et al. |
| 2009/0313035 A1 | 12/2009 | Esser et al. |
| 2010/0011415 A1 | 1/2010 | Cortes et al. |
| 2010/0023393 A1 | 1/2010 | Costy et al. |
| 2010/0070343 A1 | 3/2010 | Taira et al. |
| 2010/0082778 A1 | 4/2010 | Muilenburg et al. |
| 2010/0082780 A1 | 4/2010 | Muilenburg et al. |
| 2010/0088158 A1 | 4/2010 | Pollack |
| 2010/0100259 A1 | 4/2010 | Geiter |
| 2010/0100506 A1 | 4/2010 | Marot |
| 2010/0131363 A1 | 5/2010 | Sievert et al. |
| 2010/0235219 A1 | 9/2010 | Merrick et al. |
| 2010/0235231 A1 | 9/2010 | Jewer |
| 2010/0293030 A1 | 11/2010 | Wu |
| 2010/0312608 A1 | 12/2010 | Shan et al. |
| 2010/0318408 A1 | 12/2010 | Sankaran et al. |
| 2010/0324777 A1 | 12/2010 | Tominaga et al. |
| 2011/0010432 A1 | 1/2011 | Uyeki |
| 2011/0015989 A1 | 1/2011 | Tidwell et al. |
| 2011/0022525 A1 | 1/2011 | Swinson et al. |
| 2011/0082804 A1 | 4/2011 | Swinson et al. |
| 2011/0145064 A1 | 6/2011 | Anderson et al. |
| 2011/0161167 A1 | 6/2011 | Jallapuram |
| 2011/0191264 A1 | 8/2011 | Inghelbrecht et al. |
| 2011/0196762 A1 | 8/2011 | Dupont |
| 2011/0224864 A1 | 9/2011 | Gellatly et al. |
| 2011/0231055 A1 | 9/2011 | Knight et al. |
| 2011/0288937 A1 | 11/2011 | Manoogian, III |
| 2011/0307296 A1 | 12/2011 | Hall et al. |
| 2011/0307411 A1 | 12/2011 | Bolivar et al. |
| 2012/0066010 A1 | 3/2012 | Williams et al. |
| 2012/0089474 A1 | 4/2012 | Xiao et al. |
| 2012/0095804 A1 | 4/2012 | Calabrese et al. |
| 2012/0116868 A1 | 5/2012 | Chin et al. |
| 2012/0158211 A1 | 6/2012 | Chen et al. |
| 2012/0209714 A1 | 8/2012 | Douglas et al. |
| 2012/0221125 A1 | 8/2012 | Bell |
| 2012/0268294 A1 | 10/2012 | Michaelis et al. |
| 2012/0278886 A1 | 11/2012 | Luna |
| 2012/0284113 A1 | 11/2012 | Pollak |
| 2012/0316981 A1 | 12/2012 | Hoover et al. |
| 2013/0046432 A1 | 2/2013 | Edwards et al. |
| 2013/0080196 A1 | 3/2013 | Schroeder et al. |
| 2013/0080305 A1 | 3/2013 | Virag et al. |
| 2013/0151334 A1 | 6/2013 | Berkhin et al. |
| 2013/0191445 A1 | 7/2013 | Gayman et al. |
| 2013/0204484 A1 | 8/2013 | Ricci |
| 2013/0226699 A1 | 8/2013 | Long |
| 2013/0325541 A1 | 12/2013 | Capriotti et al. |
| 2013/0332023 A1 | 12/2013 | Bertosa et al. |
| 2014/0012659 A1 | 1/2014 | Yan |
| 2014/0026037 A1 | 1/2014 | Garb et al. |
| 2014/0052327 A1 | 2/2014 | Hosein et al. |
| 2014/0088866 A1 | 3/2014 | Knapp et al. |
| 2014/0094992 A1 | 4/2014 | Lambert et al. |
| 2014/0122178 A1 | 5/2014 | Knight |
| 2014/0136278 A1 | 5/2014 | Carvalho |
| 2014/0229391 A1 | 8/2014 | East et al. |
| 2014/0244110 A1 | 8/2014 | Tharaldson et al. |
| 2014/0277906 A1 | 9/2014 | Lowrey et al. |
| 2014/0278805 A1 | 9/2014 | Thompson |
| 2014/0316825 A1 | 10/2014 | Van Dijk et al. |
| 2014/0324275 A1 | 10/2014 | Stanek et al. |
| 2014/0324536 A1 | 10/2014 | Cotton |
| 2014/0331301 A1 | 11/2014 | Subramani et al. |
| 2014/0337163 A1 | 11/2014 | Whisnant |
| 2014/0379530 A1 | 12/2014 | Kim et al. |

(56) References Cited

U.S. PATENT DOCUMENTS

| | | | |
|---|---|---|---|
| 2014/0379817 A1* | 12/2014 | Logue | G06Q 10/107 709/206 |
| 2015/0057875 A1 | 2/2015 | McGinnis et al. | |
| 2015/0066781 A1 | 3/2015 | Johnson et al. | |
| 2015/0066933 A1 | 3/2015 | Kolodziej et al. | |
| 2015/0100199 A1 | 4/2015 | Kurnik et al. | |
| 2015/0142256 A1 | 5/2015 | Jones | |
| 2015/0227894 A1 | 8/2015 | Mapes, Jr. et al. | |
| 2015/0268059 A1 | 9/2015 | Borghesani et al. | |
| 2015/0278886 A1 | 10/2015 | Fusz | |
| 2015/0286979 A1 | 10/2015 | Ming et al. | |
| 2015/0334165 A1 | 11/2015 | Arling et al. | |
| 2016/0004516 A1 | 1/2016 | Ivanov et al. | |
| 2016/0059412 A1 | 3/2016 | Oleynik | |
| 2016/0071054 A1 | 3/2016 | Kakarala et al. | |
| 2016/0092944 A1 | 3/2016 | Taylor et al. | |
| 2016/0132935 A1 | 5/2016 | Shen et al. | |
| 2016/0140609 A1 | 5/2016 | Demir | |
| 2016/0140620 A1 | 5/2016 | Pinkowish et al. | |
| 2016/0140622 A1 | 5/2016 | Wang et al. | |
| 2016/0148439 A1 | 5/2016 | Akselrod et al. | |
| 2016/0180358 A1 | 6/2016 | Battista | |
| 2016/0180378 A1 | 6/2016 | Toshida et al. | |
| 2016/0180418 A1 | 6/2016 | Jaeger | |
| 2016/0267503 A1 | 9/2016 | Zakai-Or et al. | |
| 2016/0275533 A1 | 9/2016 | Smith et al. | |
| 2016/0307174 A1 | 10/2016 | Marcelle et al. | |
| 2016/0357599 A1 | 12/2016 | Glatfelter | |
| 2016/0371641 A1 | 12/2016 | Wilson et al. | |
| 2017/0034547 A1 | 2/2017 | Jain et al. | |
| 2017/0039785 A1 | 2/2017 | Richter et al. | |
| 2017/0053460 A1 | 2/2017 | Hauser et al. | |
| 2017/0064038 A1 | 3/2017 | Chen | |
| 2017/0124525 A1 | 5/2017 | Johnson et al. | |
| 2017/0262894 A1 | 9/2017 | Kirti et al. | |
| 2017/0293894 A1 | 10/2017 | Taliwal et al. | |
| 2017/0308844 A1 | 10/2017 | Kelley | |
| 2017/0308864 A1 | 10/2017 | Kelley | |
| 2017/0308865 A1 | 10/2017 | Kelley | |
| 2017/0316459 A1 | 11/2017 | Strauss et al. | |
| 2017/0337573 A1 | 11/2017 | Toprak | |
| 2017/0352054 A1 | 12/2017 | Ma et al. | |
| 2018/0095733 A1 | 4/2018 | Torman et al. | |
| 2018/0225710 A1 | 8/2018 | Kar et al. | |
| 2018/0232749 A1 | 8/2018 | Moore, Jr. et al. | |
| 2018/0285901 A1 | 10/2018 | Zackrone | |
| 2018/0285925 A1 | 10/2018 | Zackrone | |
| 2019/0297162 A1 | 9/2019 | Amar et al. | |
| 2019/0334884 A1 | 10/2019 | Ross et al. | |
| 2020/0019388 A1* | 1/2020 | Jaeger | G06F 9/5077 |
| 2020/0038363 A1 | 2/2020 | Kim | |
| 2020/0177476 A1* | 6/2020 | Agarwal | G06F 16/258 |
| 2021/0287106 A1 | 9/2021 | Jerram | |
| 2022/0046105 A1 | 2/2022 | Amar et al. | |

OTHER PUBLICATIONS

U.S. Appl. No. 10/665,899, Final Office Action, dated Feb. 24, 2010, 22 pages.

U.S. Appl. No. 10/665,899, Final Office Action, dated May 11, 2009, 14 pages.

U.S. Appl. No. 10/665,899, Non-Final Office Action, dated Nov. 13, 2008, 11 pages.

U.S. Appl. No. 10/665,899, Non-Final Office Action, dated Sep. 14, 2009, 14 pages.

U.S. Appl. No. 11/149,909, Final Office Action, dated Feb. 4, 2009, 14 pages.

U.S. Appl. No. 11/149,909, Non-Final Office Action, dated May 13, 2008, 14 pages.

U.S. Appl. No. 11/149,909, Non-Final Office Action, dated May 6, 2009, 6 pages.

U.S. Appl. No. 11/149,909, Notice of Allowance, dated Sep. 16, 2009, 7 pages.

U.S. Appl. No. 11/414,939, Non-Final Office Action, dated Jul. 19, 2010, 7 pages.

U.S. Appl. No. 11/414,939, Notice of Allowance, dated Nov. 2, 2010.

U.S. Appl. No. 11/442,821, Final Office Action, dated Apr. 7, 2009, 19 pages.

U.S. Appl. No. 11/442,821, Notice of Allowance, dated Jul. 30, 2012, 6 pages.

U.S. Appl. No. 11/442,821, Non-Final Office Action, dated Jun. 1, 2011, 23 pages.

U.S. Appl. No. 11/442,821, Final Office Action, dated May 21, 2010, 28 pages.

U.S. Appl. No. 11/442,821, Non-Final Office Action, dated Nov. 12, 2009, 19 pages.

U.S. Appl. No. 11/442,821, Final Office Action, dated Nov. 29, 2011, 26 pages.

U.S. Appl. No. 11/442,821, Non-Final Office Action, dated Sep. 3, 2008, 14 pages.

U.S. Appl. No. 11/446,011, Notice of Allowance, dated Aug. 9, 2011, 10 pages.

U.S. Appl. No. 11/446,011, Final Office Action, dated Jun. 8, 2010, 12 pages.

U.S. Appl. No. 11/446,011, Non-Final Office Action, dated Mar. 1, 2011, 15 pages.

U.S. Appl. No. 11/524,602, Notice of Allowance, dated Aug. 6, 2013, 22 pages.

U.S. Appl. No. 11/524,602, Non-Final Office Action, dated Dec. 11, 2009, 20 pages.

U.S. Appl. No. 11/524,602, Final Office Action, dated Jul. 27, 2010, 13 pages.

U.S. Appl. No. 11/524,602, Non-Final Office Action, dated Nov. 14, 2011, 19 pages.

U.S. Appl. No. 11/525,009, Non-Final Office Action, dated Aug. 10, 2011, 18 pages.

U.S. Appl. No. 11/525,009, Final Office Action, dated Aug. 3, 2010, 16 pages.

U.S. Appl. No. 11/525,009, Non-Final Office Action, dated Dec. 16, 2009, 20 pages.

U.S. Appl. No. 11/525,009, Notice of Allowance, dated Jul. 23, 2012, 19 pages.

U.S. Appl. No. 12/243,852, Restriction Requirement, dated Dec. 7, 2010.

U.S. Appl. No. 12/243,852, Notice of Allowance, dated Feb. 27, 2013, 6 pages.

U.S. Appl. No. 12/243,852, Non-Final Office Action, dated Jan. 16, 2013, 5 pages.

U.S. Appl. No. 12/243,852, Non-Final Office Action, dated Mar. 17, 2011, 8 pages.

U.S. Appl. No. 12/243,852, Supplemental Notice of Allowability, dated Mar. 19, 2013, 3 pages.

U.S. Appl. No. 12/243,852, Final Office Action, dated Oct. 24, 2011, 13 pages.

U.S. Appl. No. 12/243,855, Notice of Allowance, dated Nov. 22, 2010, 10 pages.

U.S. Appl. No. 12/243,855, Non-Final Office Action, dated Oct. 14, 2010, 6 pages.

U.S. Appl. No. 12/243,855, Notice of Allowance, dated Oct. 28, 2010, 5 pages.

U.S. Appl. No. 12/243,861, Final Office Action, dated Jun. 22, 2011, 5 pages.

U.S. Appl. No. 12/243,861, Non-Final Office Action, dated Nov. 8, 2010, 8 pgs.

U.S. Appl. No. 12/243,861, Notice of Allowance, dated Sep. 6, 2011, 10 pgs.

U.S. Appl. No. 13/025,019, Non-Final Office Action, dated Apr. 22, 2016, 16 pages.

U.S. Appl. No. 13/025,019, Non-Final Office Action, dated Apr. 5, 2013, 15 pages.

U.S. Appl. No. 13/025,019, Final Office Action, dated Aug. 28, 2015, 25 pages.

U.S. Appl. No. 13/025,019, Non-Final Office Action, dated Sep. 18, 2014, 15 pages.

(56) References Cited

OTHER PUBLICATIONS

U.S. Appl. No. 13/025,019, Non-Final Office Action, dated Oct. 6, 2017, 17 pages.
Bedell, Doug, Dallas Morning News, "I Know Someone Who Knows Kevin Bacon". Oct. 27, 1998. 4 pgs.
Chadwick, D.W., "Understanding X.500—The Directory", Available at <http://sec.cs.kent.ac.uk/x500book/>. Entire work cited., 1996.
Chatterjee, Pallab, et al., "On-board diagnostics not just for racing anymore", EDN.com, May 6, 2013, 7 pages.
Chen, Deren, "Business to Business Standard and Supply Chain System Framework in Virtual Enterprises", Computer Supported Cooperative Work in Design, The Sixth International Conference on 2001, pp. 472-476.
Clemens Grelck, "A Multithread Compiler Backend for High-Level Array Programming", 2003.
CNY Business Journal, "Frank La Voila named Southern Tier Small-Business Person of 1999", Jun. 11, 1999, 2 pages.
Croswell, Wayne, "Service Shop Optimiztion", Modern Tire Retailer, May 21, 2013, 7 pages.
Davis, Peter T., et al., "Sams Teach Yourself Microsoft Windows NT Server 4 in 21 Days", Sams® Publishing, ISBN: 0-672-31555-6, 1999, printed Dec. 21, 2008, 15 pages.
Derfler, Frank J., et al., "How Networks Work: Millennium Edition", Que, A Division of Macmillan Computer Publishing, ISBN: 0-7897-2445-6, 2000, 9 pages.
Drawbaugh, Ben, "Automatic Link Review: an expensive way to learn better driving habits", Endgadget.com, Nov. 26, 2013, 14 pages.
Emmanuel, Daniel, "Basics to Creating an Appointment System for Automotive Service Customers", Automotiveservicemanagement.com, 2006, 9 pages.
Hogue, et al., "Thresher: Automating the Unwrapping of Semantic Content from the World Wide Web", ACM, 2005, pp. 86-95.
Housel, Barron C., et al., "WebExpress: A client/intercept based system for optimizing Web browsing in a wireless environment", Google, 1998, pp. 419-431.
Hu, Bo, "A Platform based Distributed Service Framework for Large-scale Cloud Ecosystem Development", IEEE Computer Society, 2015, 8 pages.
Interconnection, In Roget's II The New Thesaurus. Boston, MA: Houghton Mifflin http://www.credoreference.com/entry/hmrogets/interconnection, 2003, Retrieved Jul. 16, 2009, 1 page.
Jenkins, Will, "Real-time vehicle performance monitoring with data intergrity", A Thesis Submitted to the Faculty of Mississippi State University, Oct. 2006, 57 pages.
Johns, Pamela, et al., "Competitive intelligence in service marketing", Marketing Intelligence & Planning, vol. 28, No. 5, 2010, pp. 551-570.
Lavrinc, Damon, "First Android-powered infotainment system coming to 2012 Saab 9-3", Autoblog.com, Mar. 2, 2011, 8 pages.
Lee, Adam J., et al., "Searching for Open Windows and Unlocked Doors: Port Scanning in Large-Scale Commodity Clusters", Cluster Computing and the Grid, 2005. IEEE International Symposium on vol. 1, 2005, pp. 146-151.
Michener, J.R., et al., "Managing System and Active-Content Integrity", Computer; vol. 33, Issue: 7,2000, pp. 108-110.
Milic-Frayling, Natasa, et al., "SmartView: Enhanced Document Viewer for Mobile Devices", Google, Nov. 15, 2002, 11 pages.
Needham, Charlie, "Google Now Taking Appointments for Auto Repair Shops", Autoshopsolutions.com, Aug. 25, 2015, 6 pages.
Open Bank Project, https://www.openbankproject.com/, retrieved Nov. 23, 2020, 10 pages.
openbay.com Web Pages, Openbay.com, retrieved from archive.org May 14, 2019, Apr. 2015, 6 pages.
openbay.com Web Pages, Openbay.com, retrieved from archive.org on May 14, 2019, Feb. 2014, 2 pages.
openbay.com Web Pages, Openbay.com, retrieved from archive.org, May 14, 2019, Mar. 2015, 11 pages.
Phelan, Mark, "Smart phone app aims to automate car repairs", Detroit Free Press Auto Critic, Mar. 31, 2015, 2 pages.
Pubnub Staff, "Streaming Vehicle Data in Realtime with Automatic (Pt 1)", Pubnub.com, Aug. 17, 2015, 13 pages.
Standards for Technology in Auto, https://www.starstandard.org/, retrieved Nov. 23, 2020, 4 pages.
Strebe, Matthew, et al., MCSE: NT Server 4 Study Guide, Third Edition. SYBEX Inc. Front matter, 2000, pp. 284-293, and 308-347.
Warren, Tamara, "This Device Determines What Ails Your Car and Finds a Repair Shop—Automatically", CarAndDriver.com, Apr. 8, 2015, 7 pages.
You, Song, et al., "Overview of Remote Diagnosis and Maintenance for Automotive Systems", 2005 SAE World Congress, Apr. 11-14, 2015, 10 pages.
http://web.archive.org/web/20010718130244/http://chromedata.com/maing2/about/index.asp, 1 pg.
http://web.archive.org/web/20050305055408/http://www.dealerclick.com/, 1 pg.
http://web.archive.org/web/20050528073821/http://www.kbb.com/, 1 pg.
http://web.archive.org/web/20050531000823/http://www.carfax.com/, 1 pg.
Internet Archive Wayback Machine, archive of LDAP Browser.com—FAQ. Archived Dec. 11, 2000. Available at <http://web.archive.org/web/200012110152/http://www.ldapbrowser.com/faq/faq.php3?sID=fe4ae66f023d86909f35e974f3a1ce>.
Internet Archive Wayback Machine, archive of LDAP Browser.com—Product Info. Archived Dec. 11, 2000. Available at <http://web.archive.org/web/200012110541/http://www.ldapbrowser.com/prodinfo/prodinfo.php3?sID=fe4ae66f2fo23d86909f35e974f3a1ce>.
Internet Archive: Audio Archive, http://www.archive.org/audio/audio-searchresults.php?search=@start=0&limit=100&sort=ad, printed May 12, 2004, 12 pgs.
Internet Archive: Democracy Now, http://www.archive.org/audio/collection.php?collection=democracy_now, printed May 12, 2004, 2 pgs.
Java 2 Platform, Enterprise Edition (J2EE) Overview, printed Mar. 6, 2010, 3 pgs.
Java version history—Wikipedia, the free encyclopedia, printed Mar. 6, 2010, 9 pgs.
Permissions in the Java™ 2 SDK, printed Mar. 6, 2010, 45 pgs.
Trademark Electronic Search System record for U.S. Appl. No. 76/375,405, Word Mark "NITRA".
"An Appointment with Destiny—The Time for Web-Enabled Scheduling has Arrived", Link Fall, 2007, 2 pages.
"How a Solution found a Problem of Scheduling Service Appointments", Automotive News, 2016, 4 pages.
"IBM Tivoli Access Manager Base Administration Guide", Version 5.1. International Business Machines Corporation. Entire book enclosed and cited., 2003, 402 pgs.
"NetFormx Offers Advanced Network Discovery Software", PR Newswire. Retrieved from http://www.highbeam.com/doc/1G1-54102907.html>., Mar. 15, 1999.
"Openbay Announces First-of-its-Kind Connected Car Repair Service", openbay.com, Mar. 31, 2015, 14 pages.
"Service Advisor", Automotive Dealership Institute, 2007, 26 pages.
"xTime.com Web Pages", Jan. 8, 2015, 1 page.
"XTimes Newsletter", vol. 7, 2013, 4 pages.
U.S. Appl. No. 10/350,795, Non-Final Office Action, dated Dec. 26, 2008, 13 pages.
U.S. Appl. No. 10/350,795, Non-Final Office Action, dated Feb. 6, 2006, 11 pages.
U.S. Appl. No. 10/350,795, Non-Final Office Action, dated Jul. 22, 2009, 22 pages.
U.S. Appl. No. 10/350,795, Final Office Action, dated Jul. 6, 2012, 26 pages.
U.S. Appl. No. 10/350,795, Non-Final Office Action, dated Jun. 29, 2006, 11 pages.
U.S. Appl. No. 10/350,795, Non-Final Office Action, dated Mar. 12, 2007, 10 pages.
U.S. Appl. No. 10/350,795, Final Office Action, dated Mar. 3, 2010, 24 pages.

(56) References Cited

OTHER PUBLICATIONS

U.S. Appl. No. 10/350,795, Non-Final Office Action, dated May 29, 2008, 10 pages.
U.S. Appl. No. 10/350,795, Notice of Allowance, dated May 7, 2012, 15 pages.
U.S. Appl. No. 10/350,795, Non-Final Office Action, dated Nov. 1, 2010, 19 pages.
U.S. Appl. No. 10/350,796, Notice of Allowance, dated Feb. 1, 2006, 5 pages.
U.S. Appl. No. 10/350,796, Non-Final Office Action, dated May 19, 2005, 7 pages.
U.S. Appl. No. 10/350,810, Notice of Allowance, dated Apr. 14, 2008, 6 pages.
U.S. Appl. No. 10/350,810, Non-Final Office Action, dated Apr. 17, 2007, 12 pages.
U.S. Appl. No. 10/350,810, Final Office Action, dated Apr. 5, 2005, 12 pages.
U.S. Appl. No. 10/350,810, Notice of Non-compliant Amendment, dated Dec. 12, 2006.
U.S. Appl. No. 10/350,810, Non-Final Office Action, dated Dec. 9, 2005, 14 pages.
U.S. Appl. No. 10/350,810, Final Office Action, dated May 18, 2006, 15 pages.
U.S. Appl. No. 10/350,810, Final Office Action, dated Nov. 14, 2007, 13 pages.
U.S. Appl. No. 10/350,810, Non-Final Office Action, dated Sep. 22, 2004, 10 pages.
U.S. Appl. No. 10/351,465, Non-Final Office Action, dated Jul. 27, 2004, 9 pages.
U.S. Appl. No. 10/351,465, Final Office Action, dated May 5, 2005, 8 pages.
U.S. Appl. No. 10/351,465, Notice of Allowance, dated Sep. 21, 2005, 4 pages.
U.S. Appl. No. 10/351,606, Notice of Allowance, dated Apr. 4, 2006, 12 pages.
U.S. Appl. No. 10/665,899, Non-Final Office Action, dated Sep. 17, 2017, 11 pages.
U.S. Appl. No. 10/351,606, Non-final Office Action, dated Dec. 19, 2005, 7 pages.
U.S. Appl. No. 10/665,899, Final Office Action, dated Mar. 8, 2011, 21 pages.
U.S. Appl. No. 10/351,606, Non-final Office Action, dated May 17, 2004, 5 pages.
U.S. Appl. No. 10/665,899, Final Office Action, dated Jul. 7, 2008, 11 pages.
U.S. Appl. No. 13/025,019, Final Office Action, dated Sep. 12, 2013, 13 pages.
U.S. Appl. No. 13/025,019, Notice of Allowance, dated Sep. 26, 2019, 9 pages.
U.S. Appl. No. 14/208,042, Final Office Action, dated Apr. 16, 2018.
U.S. Appl. No. 14/208,042, Non-Final Office Action, dated Aug. 21, 2020, 13 pages.
U.S. Appl. No. 14/208,042, Final Office Action, dated Jan. 11, 2019, 16 pages.
U.S. Appl. No. 14/208,042, Advisory Action, dated Jul. 12, 2018.
U.S. Appl. No. 14/208,042, Non-Final Office Action, dated Jun. 30, 2016, 23 pages.
U.S. Appl. No. 14/208,042, Notice of Allowance, dated May 6, 2021, 13 pages.
U.S. Appl. No. 14/208,042, Non-Final Office Action, dated Sep. 20, 2017.
U.S. Appl. No. 14/208,042, Non-Final Office Action, dated Sep. 21, 2018.
U.S. Appl. No. 15/134,779, Final Office Action, dated Feb. 27, 2020, 18 pages.
U.S. Appl. No. 15/134,779, Non-Final Office Action, dated Jan. 30, 2019, 26 pages.
U.S. Appl. No. 15/134,779, Advisory Action, dated Jul. 29, 2019, 6 pages.
U.S. Appl. No. 15/134,779, Final Office Action, dated May 17, 2019, 25 pages.
U.S. Appl. No. 15/134,779, Non-Final Office Action, dated Nov. 19, 2019, 27 pages.
U.S. Appl. No. 15/134,779, Notice of Allowance, dated Sep. 9, 2020, 12 pages.
U.S. Appl. No. 15/134,793, Non-Final Office Action, dated Jan. 30, 2019, 26 pages.
U.S. Appl. No. 15/134,793, Advisory Action, dated Jul. 29, 2019, 6 pages.
U.S. Appl. No. 15/134,793, Final Office Action, dated Mar. 27, 2020, 22 pages.
U.S. Appl. No. 15/134,793, Final Office Action, dated May 13, 2019, 26 pages.
U.S. Appl. No. 15/134,793, Non-Final Office Action, dated Nov. 19, 2019, 31 pages.
U.S. Appl. No. 15/134,793, Notice of Allowance, dated Nov. 2, 2020, 13 pages.
U.S. Appl. No. 15/134,820, Non-Final Office Action, dated Feb. 23, 2018.
U.S. Appl. No. 15/134,820, Notice of Allowance, dated Jan. 28, 2019, 7 pages.
U.S. Appl. No. 15/134,820, Final Office Action, dated Sep. 21, 2018.
U.S. Appl. No. 15/478,042, Non-Final Office Action, dated Aug. 4, 2020, 42 pages.
U.S. Appl. No. 15/478,042, Final Office Action, dated Mar. 19, 2020, 35 pages.
U.S. Appl. No. 15/478,042, Final Office Action, dated May 5, 2021, 38 pages.
U.S. Appl. No. 15/478,042, Non-Final Office Action, dated Oct. 10, 2019, 26 pages.
U.S. Appl. No. 15/478,048, Final Office Action, dated Apr. 9, 2020, 42 pages.
U.S. Appl. No. 15/478,048, Non-Final Office Action, dated Mar. 8, 2021, 69 pages.
U.S. Appl. No. 15/478,048, Final Office Action, dated Sep. 17, 2021, 32 pages.
U.S. Appl. No. 15/478,048, Non-Final Office Action, dated Sep. 30, 2019, 30 pages.
U.S. Appl. No. 15/602,999, Notice of Allowance, dated Apr. 18, 2019, 6 pages.
U.S. Appl. No. 15/602,999, Advisory Action, dated Jan. 31, 2019, 3 pages.
U.S. Appl. No. 15/602,999, Non-Final Office Action, dated May 3, 2018.
U.S. Appl. No. 15/602,999, Final Office Action, dated Nov. 21, 2018.
U.S. Appl. No. 16/041,552, Final Office Action, dated Apr. 27, 2021, 23 pages.
U.S. Appl. No. 16/041,552, Non-Final Office Action, dated Dec. 27, 2019, 13 pages.
U.S. Appl. No. 16/041,552, Final Office Action, dated May 29, 2020, 18 pages.
U.S. Appl. No. 16/041,552, Non-Final Office Action, dated Sep. 17, 2020, 16 pages.
U.S. Appl. No. 16/041,552, Notice of Allowance, dated Sep. 30, 2021, 17 pages.
U.S. Appl. No. 16/911,154, Non-Final Office Action, dated Sep. 16, 2021, 15 pages.
U.S. Appl. No. 16/951,833, Non-Final Office Action, dated Feb. 4, 2021, 10 pages.
U.S. Appl. No. 16/951,833, Notice of Allowance, dated Jun. 16, 2021, 14 pages.
Aloisio, Giovanni, et al., "Web-based access to the Grid using the Grid Resource Broker portal", Google, 2002, pp. 1145-1160.
Anonymous, "Software ready for prime time", Automotive News. Detroit, vol. 76, Issue 5996, Nov. 5, 2001, p. 28.
U.S. Appl. No. 16/911,154, Non-Final Office Action, dated Mar. 28, 2022, 17 pages.
Internet Archive Dan Gillmor Sep. 1, 1996.
U.S. Appl. No. 11/414,939, Non-Final Office Action, dated Mar. 9, 2010, 11 pages.

(56) References Cited

OTHER PUBLICATIONS

U.S. Appl. No. 11/446,011, Non-Final Office Action, dated Nov. 27, 2009, 14 pages.
U.S. Appl. No. 11/524,602, Final Office Action, dated Jun. 26, 2012, 11 pages.
U.S. Appl. No. 13/025,019, Final Office Action, dated Dec. 20, 2016, 16 pages.
U.S. Appl. No. 13/025,019, Final Office Action, dated Jul. 13, 2018, 11 pages.
U.S. Appl. No. 14/208,042, Final Office Action, dated Dec. 6, 2016, 26 pages.
U.S. Appl. No. 15/478,042, Non-Final Office Action, dated Nov. 19, 2021, 45 pages.

* cited by examiner

SYSTEMS, METHODS, AND APPARATUSES FOR SCANNING A LEGACY DATABASE

TECHNICAL FIELD

The present disclosure relates generally to data validation when replacing a database. More specifically, the present disclosure relates to methods, systems, and apparatuses for detecting updates to records in a legacy database that is running in parallel with a modern database.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
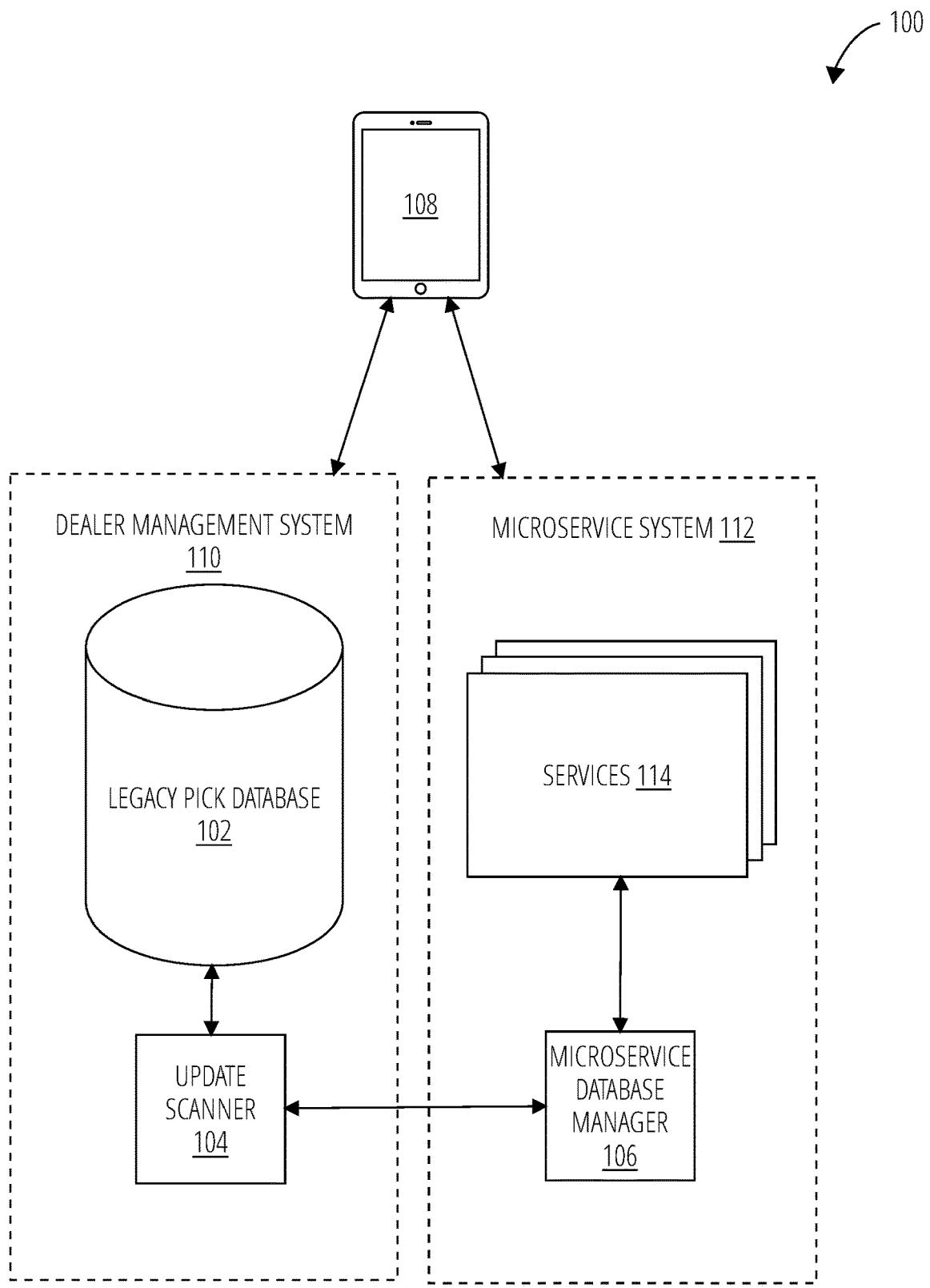
FIG. 1 illustrates a block diagram of a data system transitioning from a dealer management system to a microservice system in accordance with one embodiment.

Described herein are embodiments of systems, apparatuses, and methods for data validation when replacing a database. A system may periodically request updates to records in a legacy database that is running in parallel with a modern database. The system may convert the legacy database records into update messages that are more efficient for the modern database to use for data validation.

Businesses occasionally replace and modernize their database environments. Often the move from a legacy database environment to a modern database environment involves moving between two different incompatible data architectures. Additionally, there is often a desire to gradually transition between the legacy database and the modern database to allow for data validation of the modern database while allowing applications to take advantage of the modern database. To provide data validation in some embodiments the two databases may be run in parallel and a validation system may compare updates to records in the legacy database against updates to the modern database. However, because the databases have different data architectures, comparing the updates may be inefficient.

One of the challenges of the transition between databases is handling the large number of updates to the legacy database. To address this challenge, embodiments below include a scanner service that are configured to scan and recognize business objects across the multiple records of the legacy database. The scanner service may use a timestamp associated with each update to the records in the legacy database to check for updates to the legacy data. The scanner service may filter out updates that are not part of a business object as well as combine separate components that together comprise a business object. The scanner service may provide an update message with the filtered and combined results.

Specific embodiments herein relate to replacing a legacy Pick environment with a modern microservice architecture. While movement between a Pick environment and a modern microservice architecture is discussed herein, embodiments herein may also be applied to transitioning between other database types.

The phrases "coupled to," "connected to," and "in communication with" refer to any form of interaction between two or more components, including mechanical, electrical, magnetic, and electromagnetic interaction. Two components may be connected to each other, even though they are not in direct contact with each other, and even though there may be intermediary devices between the two components.

It will be readily understood that the components of the embodiments as generally described below and illustrated in the Figures herein could be arranged and designed in a wide variety of different configurations. For instance, the steps of a method do not necessarily need to be executed in any specific order, or even sequentially, nor do the steps need to be executed only once. Thus, the following more detailed description of various embodiments, as described below and represented in the Figures, is not intended to limit the scope of the disclosure but is merely representative of various embodiments. While the various aspects of the embodiments are presented in the drawings, the drawings are not necessarily drawn to scale unless specifically indicated.

Embodiments and implementations of systems and methods described herein may include various steps, which may be embodied in machine-executable instructions to be executed by a computer system. A computer system may include one or more general-purpose or special-purpose computers (or other electronic devices). The computer system may include hardware components that include specific logic for performing the steps or may include a combination of hardware, software, and/or firmware.

Embodiments may be provided as a computer program product including a computer-readable medium having stored thereon instructions that may be used to program a computer system or other electronic device to perform the processes described herein. The computer-readable medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/computer-readable media suitable for storing electronic instructions.

Computer systems and the computers in a computer system may be connected via a network. Suitable networks for configuration and/or use as described herein include one or more local area networks, wide area networks, metropolitan area networks, and/or Internet or Internet Protocol (IP) networks, such as the World Wide Web, a private Internet, a secure Internet, a value-added network, a virtual private network, an extranet, an intranet, or even stand-alone machines that communicate with other machines by physical transport of media. In particular, a suitable network may be formed from parts or entireties of two or more other networks, including networks using disparate hardware and network communication technologies.

One suitable network includes a server and several clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, mobile computer, server, mainframe, cluster, so-called "network computer" or "thin client," tablet, smart phone, personal digital assistant or other hand-held computing device, "smart" consumer electronics device or appliance, medical device, or combination thereof.

Suitable networks may include communications or networking software, such as the software available from Novell®, Microsoft®, and other vendors, and may operate using Transfer Control Protocol (TCP)/IP, SPX, IPX, and other protocols over twisted pair, coaxial, or optical fiber cables; telephone lines; radio waves; satellites; microwave relays; modulated AC power lines; physical media transfer; and/or other data transmission "wires" known to those of skill in the art. The network may encompass smaller networks and/or be connectable to other networks through a gateway or similar mechanism.

Each computer system includes one or more processors and/or memory; computer systems may also include various input devices and/or output devices. The processor may include a general-purpose device, such as an Intel®, AMD®, or other "off-the-shelf" microprocessor. The processor may include a special-purpose processing device, such as an ASIC, SoC, SiP, FPGA, PAL, PLA, FPLA, PLD, or other customized or programmable device. The memory may include static RAM, dynamic RAM, flash memory, one or more flip-flops, ROM, CD-ROM, disk, tape, magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The computer systems may be capable of using a floppy drive, a tape drive, an optical drive, a magneto-optical drive, or other means to read a storage medium. A suitable storage medium includes a magnetic, an optical, or other computer-readable storage device having a specific physical configuration. Suitable storage devices include floppy disks, hard disks, tape, CD-ROMs, DVDs, PROMs, RAM, flash memory, and other computer system storage devices. The physical configuration represents data and instructions that cause the computer system to operate in a specific and predefined manner as described herein.

Suitable software to assist in implementing the invention is readily provided by those of skill in the pertinent art(s) using the teachings presented here and programming languages and tools, such as Modern Fortran, Java, Pascal, C++, C, PHP, .Net, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Aspects of certain embodiments may be implemented as software modules or components. As used herein, a software module or component may include any type of computer instruction or computer executable code located within or on a computer-readable storage medium. A software module may, for instance, comprise one or more physical or logical blocks of computer instructions, which may be organized as a routine, a program, an object, a component, a data structure, etc. that performs one or more tasks or implement particular abstract data types. A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media.

Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network. According to one embodiment, a database management system (DBMS) allows users to interact with one or more databases and provides access to the data contained in the databases.

FIG. 1 illustrates a block diagram of a data system 100 transitioning from a dealer management system 110 to a microservice system 112. As shown, the data system 100 may operate two databases in parallel during a transition from a legacy database (e.g., dealer management system 110) to a modern database (e.g., microservice system 112).

Running the two databases in parallels may allow for a gradual rollout of the new architecture in a way that permits data validation and allows older applications to take advantage of the new environment. For example, an application running on a computing device 108 may have been developed for the legacy dealer management system 110. To upgrade to the microservice system 112 it may be desirous to have the application access both the microservice system 112 and the dealer management system 110 in parallel and track the changes in the dealer management system 110 in comparison to the microservice system 112 to validate that all of the changes to data in the dealer management system 110 are being captured by the microservice system 112.

For example, a business may desire to replace a legacy Pick environment (e.g., dealer management system 110) with a modern microservice architecture. A Pick environment includes an operating system for databases that was developed decades ago. The Pick environment has an architecture with a centralized dealer management system 110 with applications and a legacy Pick database 102. A dealer management system 110 may refer to a stand-alone computer system that hosts the legacy data and code. Each client (i.e., a user of the data system 100) may have at least one dealer management system 110 to host the client's applications and data. Occasionally a client may have more than one dealer management system 110.

The legacy software and database for the dealer management system 110 may have been developed over a long period of time. As a consequence, there may be a very large amount of messy code, messy database design, and complexity. For example, information corresponding to a specific object (e.g., customer, vendor, financial institution) controlled by the application of the computing device 108 may be spread over several data files. To further complicate matters, the data files may not be homogenous with respect to one object. For example, information corresponding to a customer may be in the same data file as information corresponding to a vendor. This unorganized and complicated set of data files may make it difficult to track changes to each object.

In contrast to the organization of the dealer management system 110, the new microservice system 112 may have a data architecture that structures an application as a collection of services 114. For example, the application controllable objects that are spread across multiple data files in the dealer management data system 100 may be ordered according to independent services 114. This change in data architecture and the complexity of the dealer management system 110 makes data validation difficult and inefficient.

To reduce the complexity and improve efficiency of data validation, an update scanner 104 may track, filter, and compile updates to information corresponding to the objects as discussed in more detail below. The update scanner 104 may send a message to a microservice database manager 106 indicating updates to records associated with the objects. Each message may contain all updates for an object to reduce the number of messages sent.

Figure 2:
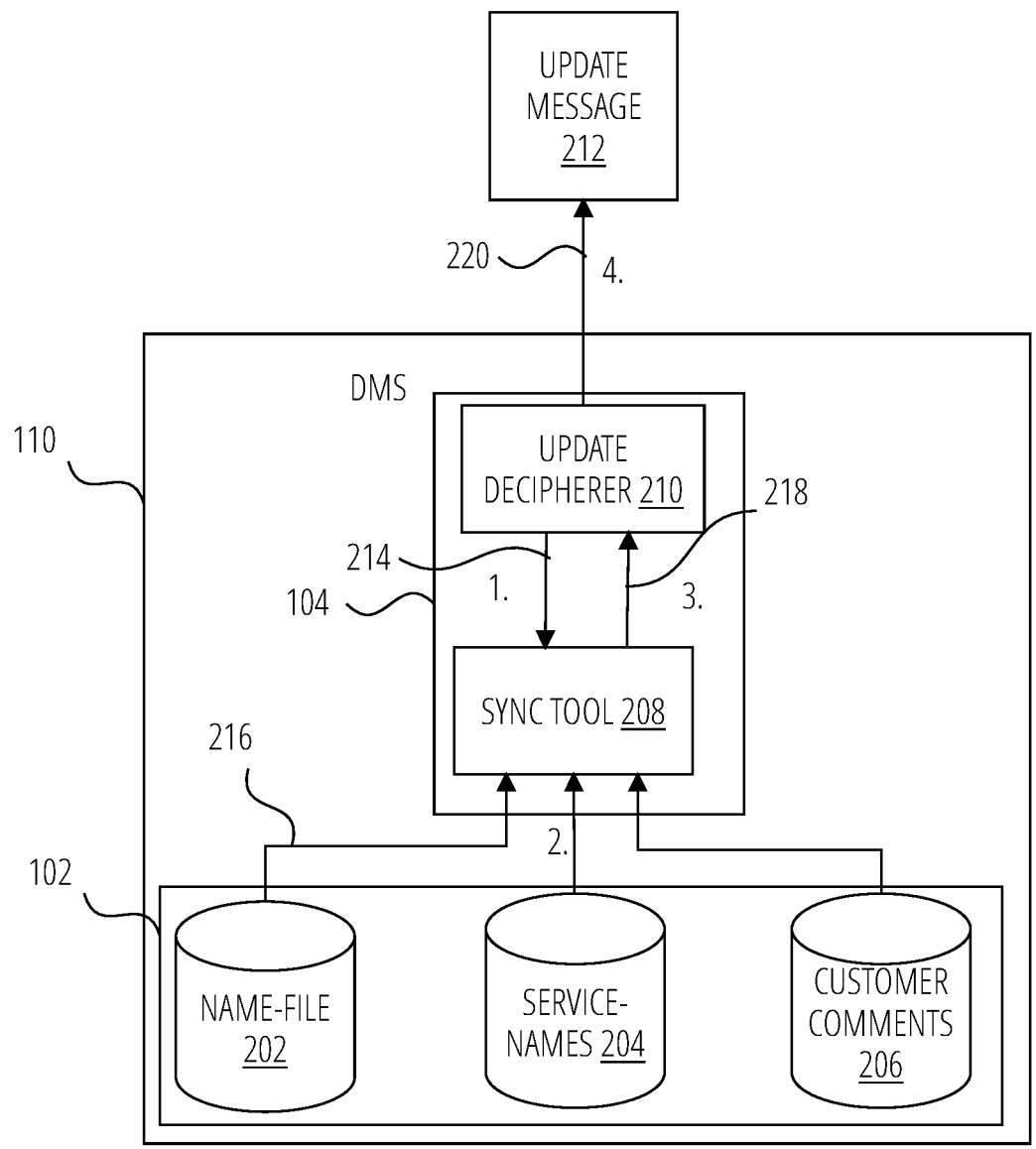
FIG. 2 illustrates a signal flow diagram for scanning a dealer management system for updates in accordance with one embodiment.

FIG. 2 illustrates a signal flow diagram for scanning a dealer management system 110 for updates according to one embodiment. In the illustrated embodiment, the dealer management system 110 belongs to a car dealership. However, a similar system may be set up for other types of clients. The dealer management system 110 comprises an update scanner 104 and a legacy Pick database 102. The update scanner 104 monitors the legacy Pick database 102 for changes and provides an update message 212 comprising a compilation of any detected changes.

The legacy Pick database 102 may comprise a plurality of data files (e.g., a name-file 202, service-names 204, and customer comments 206). Each data file may comprise a series of items or records that make up data elements of the data file. As the legacy Pick database 102 may have been developed and updated for several decades, there may be a very large amount of messy code, messy database design, and complexity that makes it difficult to completely replicate the functions of the legacy Pick database 102 on a new database system.

Accordingly, data validation may be desirous. Data validation may include determining that the updates occurring on the legacy Pick database 102 are also captured on the new database system that is running in parallel. Part of determining that the updates have occurred on both systems includes monitoring changes on the legacy Pick database 102. However, the data structure of the legacy Pick database 102 may make it difficult to track the updates to a new data structure.

For example, the new data structure may be developed around a plurality of objects. Objects, also referred to herein as business objects, may be a collection of closely related data elements, items, and/or records that represent information that a client business works with. For example, business objects may include customers, vehicles, and vehicle purchase contracts. Items related to one object may be incorporated into multiple data files on the legacy Pick database 102.

Additionally, each data file in the legacy Pick database 102 may include items related to multiple objects. Items are stored in the data files. A Pick item may correspond roughly to a record in a modern database. In other words, a Pick item may be described as a document, rather than a record. An example of a non-homogenous file may include the name-file 202. The name-file 202 may contain most of the customer business object information. However, the name-file 202 may also contains information about other business objects, such as employees, vendors, financial institutions, and more. In some embodiments, a customer item in the name-file 202 may also even contain accounts receivable amounts and aging information.

As shown, the update scanner 104 may comprise an update decipherer 210 and a sync tool 208. The update decipherer 210 may be a daemon or service that runs on the legacy system (e.g., dealer management system 110). The update decipherer 210 is configured to recognize items in the data files that comprise different business objects. The sync tool 208 may be a service that also runs on the legacy system. It may not be able to recognize business objects like the update decipherer 210, but it may be able to poll the data files and return keys to the latest updates for files. The update decipherer 210 may be able to search for Pick files, items within the Pick files, and the timestamps stored with items.

To scan for updates to the legacy Pick database 102, the update decipherer 210 may periodically request 214 the latest updates to Pick data files. The update decipherer 210 sends the request 214 to the sync tool 208. In some embodiments, the request 214 may include a uniform resource identifier (URI). The URI may identify one or more data files to be checked for updates and an indication of a desired period of time during which the updates occurred. For example, the update decipherer 210 may send a URI, such as http://localhost:10229/dbsync/v1/D100093794/NAME-FILE?sel=1565724886.475, to the sync tool 208. This example URI requests updates that have occurred in the name-file 202 since 1565724886.475. The update decipherer 210 may send additional requests for other files that contain a business object (e.g., customer information) that the update decipherer 210 is gathering updates for.

The sync tool 208 receives the request and may extract 216 the updated item keys from the data files in the specified time range. The item keys may comprise an item identifier and a timestamp of a last update. The sync tool 208 may return 218 keys corresponding to updates for the data files requested by the update decipherer 210. An example below shows a sample return document that the sync tool 208 may send to the update decipherer 210. The sample return document indicates that items "4*9014" and "4*11341" have been updated in the requested range. In some embodiments, microsecond precise timestamp can be included in the return document.

```
<?xml version="1.0" encoding="ISO-8859-1"?>
<response>
  <pickdata>
    <requestparams>
      <accountname>TEST-A</accountname>
      <timerangebegin>1603192353.0</timerangebegin>
      <timerangeend>unspecified</timerangeend>
      <file>NAME-FILE</file>
      <dictrequested>false</dictrequested>
    </requestparams>
    <item>
      <id>4*9014</id>
      <ts>1603193254.561832</ts>
    </item>
    <item>
      <id>4*11341</id>
      <ts>1603194551.481608</ts>
    </item>
  </pickdata>
</response>
```

The update decipherer 210 may assemble the item keys associated with a business object into an update message 212. To assemble the update message 212, the update decipherer 210 may combine information from multiple data files such as the name-file 202, service-names 204, and customer comments 206. The update decipherer 210 may ignore content from the item keys returned by the sync tool 208 that do not relate to the business object that the update decipherer 210 is compiling the update message 212 for. The update decipherer 210 may generate an update message 212 for customer business objects, vehicle business objects, and vehicle purchase contract business objects. In some embodiments, each update message 212 may include all updates to a single business object during the identified time period. The update decipherer 210 may convert the data that it has compiled into JSON messages for the update message 212. The messages may include one message per customer update. That is, for each customer business object, the update decipherer 210 may send one message.

The update decipherer 210 may send 220 the update message 212 to the modern database system for data verification. In some embodiments, the update message 212 may use Kafka messaging to send information from the legacy system to the new microservice system. In some embodiments, the message may comprise the item keys and update time stamp. For example, the message may look like the following example.

```
{
    "domain" : "Customer",
    "enterprise_id" : "E207187",
    "keys" : [
        {
            "depts" : [ "D100093794" ],
            "id" : "9014",
            "timestamp" : "1603193254.561832",
            "type" : "4"
        }
    ],
    "store_id" : "S100023739"
}
```

Figure 3:
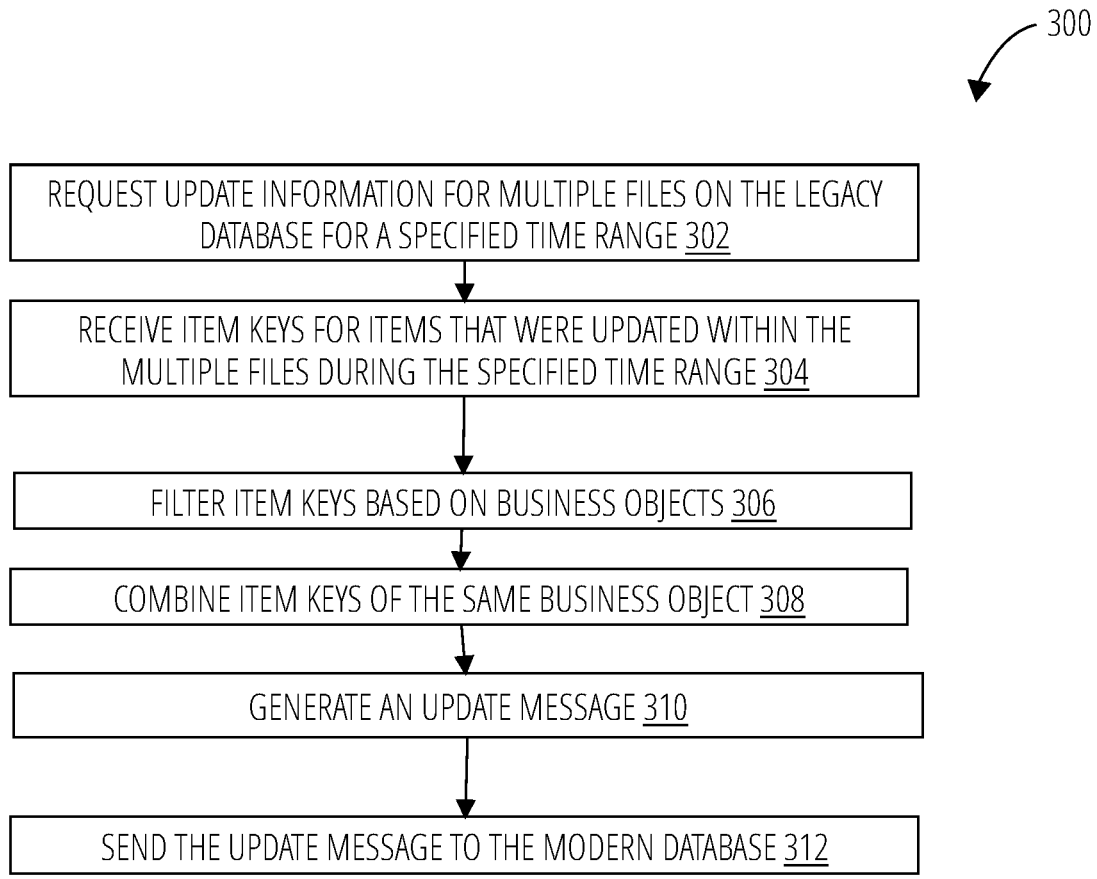
FIG. 3 illustrates a method for scanning for updates in a legacy database system in accordance with one embodiment.

FIG. 3 illustrates a method 300 for scanning for updates in a legacy database system in accordance with one embodiment. The method 300 may be performed by an update scanning system such as the update scanner 104 in FIG. 1. The legacy database may be a Pick environment and the modern database modern microservice architecture.

As shown, a system using the method 300 may request 302 update information for multiple files on the legacy database for a specified time range. The method 300 may further request 214 item keys for items that were updated within the multiple files during the specified time range. The item keys may comprise an item identifier and a timestamp of a last update of the item. The items may be data elements within data files of the legacy database.

The system using the method 300 may receive 304 and process the item keys for items that were updated within the multiple files during the specified time range. To process the item keys, the system may filter 306 item keys based on which business object each item corresponds to. For example, the system may separate items related to customer business objects, employee business objects, vendor business objects, and financial institution business objects. In some embodiments, the data files may not be homogenous with respect to business object content. Thus, the system may need to search multiple data files to find item keys related to each of the business objects.

The system using the method 300 may combine 308 item keys from across the multiple files that correspond with a same business object. The system may assemble or compile these keys into a JSON message to generate 310 an update message. The system may send 312 the update message to the modern database. Additional update messages may be generated for additional business objects, and each update message may comprise all of the item keys associated with a corresponding business object during the specified time range. In some embodiments, the update message comprises a single notification for all updates associated with a same customer account.

Figure 4:
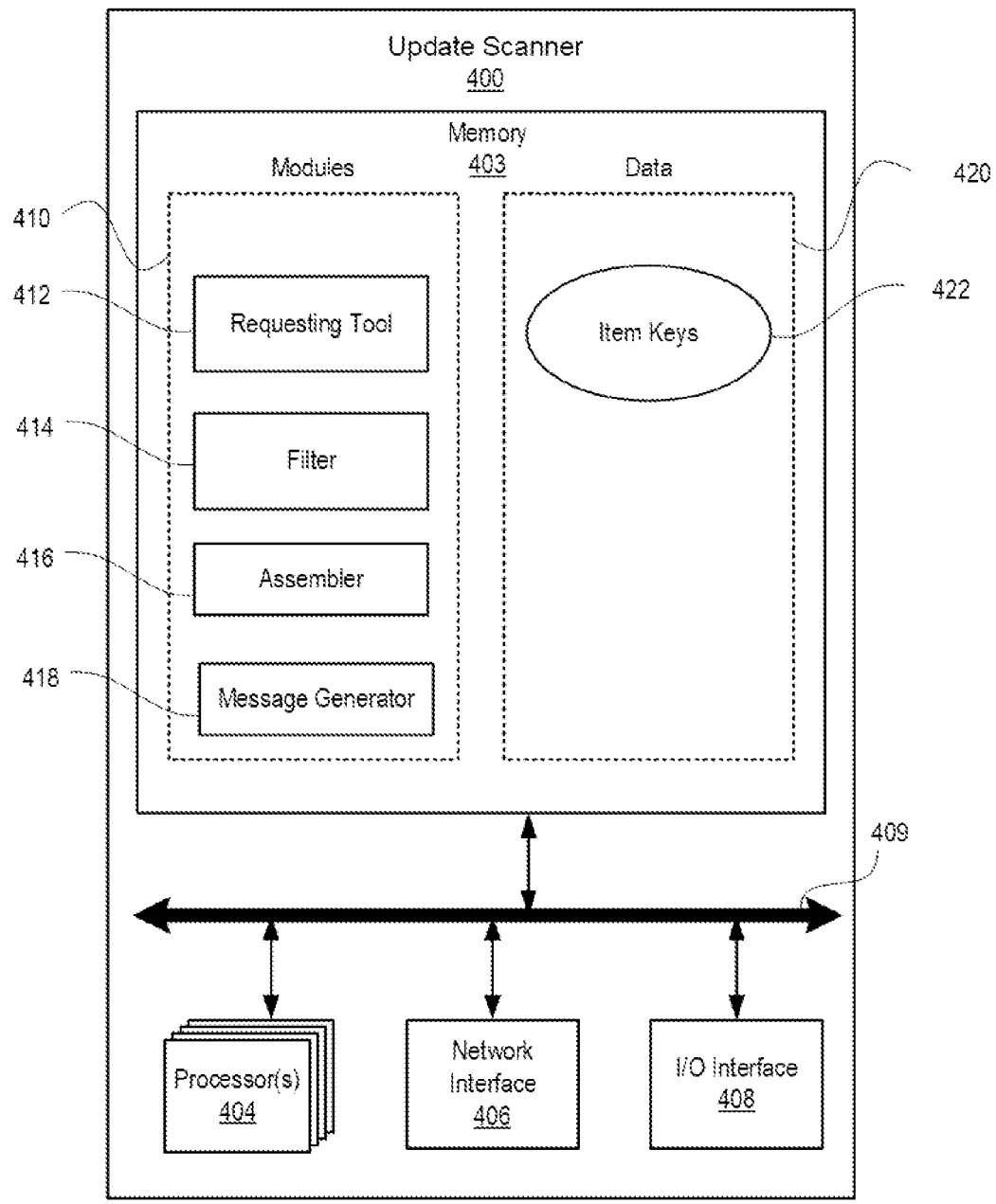
FIG. 4 is a block diagram of an update scanner in accordance with one embodiment.

FIG. 4 is a block diagram of an update scanner 400 according to one embodiment. The update scanner 400 may perform the methods and use the techniques described with reference to the other Figures in the specification. The update scanner 400 can include a memory 403, one or more processors 404, a network interface 406, an input/output interface 408, and a system bus 409.

The one or more processors 404 may include one or more general-purpose devices, such as an Intel®, AMD®, or other standard microprocessor. The one or more processors 404 may include a special-purpose processing device, such as ASIC, SoC, SiP, FPGA, PAL, PLA, FPLA, PLD, or other customized or programmable device. The one or more processors 404 can perform distributed (e.g., parallel) processing to execute or otherwise implement functionalities of the presently disclosed embodiments. The one or more processors 404 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The memory 403 may include static RAM, dynamic RAM, flash memory, one or more flip-flops, ROM, CD-ROM, DVD, disk, tape, or magnetic, optical, or other computer storage medium. The memory 403 may include a plurality of program modules 410 and program data 420. The memory 403 may be local to the update scanner 400, as shown, or may be distributed and/or remote relative to the update scanner 400.

Data generated or used by the update scanner 400, such as by the program modules 410 or other modules, may be stored on the memory 403, for example, as stored program data 420. The data 420 may be organized as one or more databases. The data 420 may include item keys 422. The item keys 422 may comprise an item identifier and a timestamp of a last update if the item. The items may be data elements within data files of the legacy database.

The program modules 410 may run multiple operations concurrently or in parallel by or on the one or more processors 404. In some embodiments, portions of the disclosed modules, components, and/or facilities are embodied as executable instructions embodied in hardware or firmware, or stored on a non-transitory, machine-readable storage medium. The executable instructions may comprise computer program code that, when executed by a processor and/or computing device, cause a computing system to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, subsystems, and/or the like.

The modules 410 may comprise a requesting tool 412, a filter 414, an assembler 416, and a message generator 418. The requesting tool 412 may request update information for multiple files on the legacy database for a specified time range. The filter 414 may filter the item keys 422 based on which business object each item corresponds to. The assembler may combine the item keys 422 related to a same business object. The item keys 422 may be from across the multiple files. The message generator 418 may generate an update message that may be sent to the modern database.

The input/output interface 408 may facilitate user interaction with one or more input devices and/or one or more output devices. The input device(s) may include a keyboard, mouse, touchscreen, light pen, tablet, microphone, sensor, or other hardware with accompanying firmware and/or software. The output device(s) may include a monitor or other display, printer, speech or text synthesizer, switch, signal line, or other hardware with accompanying firmware and/or software. For example, in one embodiment, the input/output interface 408 comprises a display to provide a graphical user interface (GUI) illustrating the potential ablation perimeters. The input/output interface 408 can receive user input data. In some embodiments, the input/output interface 408 is a touchscreen, and the size input is received via the touchscreen. In some embodiments, the input/output interface 408 can superimpose the target ablation perimeters on an image of the tissue.

The network interface 406 may facilitate communication with other computing devices and/or networks and/or other computing and/or communications networks. The network interface 406 may be equipped with conventional network connectivity, such as, for example, Ethernet (IEEE 1102.3), Token Ring (IEEE 1102.5), Fiber Distributed Datalink Interface (FDDI), or Asynchronous Transfer Mode (ATM). Further, the network interface 406 may be configured to support a variety of network protocols such as, for example, IP, TCP, Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The system bus 409 may facilitate communication and/or interaction between the other components of the update scanner 400, including the one or more processors 404, the memory 403, the input/output interface 408, and the network interface 406.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

While specific embodiments of stents have been illustrated and described, it is to be understood that the disclosure provided is not limited to the precise configuration and components disclosed. Various modifications, changes, and variations apparent to those of skill in the art having the benefit of this disclosure may be made in the arrangement, operation, and details of the methods and systems disclosed, with the aid of the present disclosure.

Without further elaboration, it is believed that one skilled in the art can use the preceding description to utilize the present disclosure to its fullest extent. The examples and embodiments disclosed herein are to be construed as merely illustrative and exemplary and not a limitation of the scope of the present disclosure in any way. It will be apparent to those having skill in the art and the benefit of this disclosure that changes may be made to the details of the above-described embodiments without departing from the underlying principles of the disclosure herein.

What is claimed is:

1. A method for tracking updates to a legacy database, the method comprising:
    operating a legacy database and a modern database in parallel;
    requesting update information for multiple files on the legacy database for a specified time range;
    receiving item keys for items that were updated within the multiple files during the specified time range;
    filtering each of the item keys based at least on their associated business item and generating an update message by combining item keys from across the multiple files that correspond with a same business object and ignoring item keys not associated with the same business object;
    sending the update message to the modern database; and
    based on receipt of the update message, performing data validation at the modern database, wherein data validation comprises determining the updates to the legacy database are captured on the modern database operating in parallel.

2. The method of claim 1, wherein the legacy database is a Pick environment and the modern database is a modern microservice architecture.

3. The method of claim 1, wherein additional update messages are generated for additional business objects, and wherein each update message comprises all of the item keys associated with a corresponding business object during the specified time range.

4. The method of claim 1, wherein the item keys comprise an item identifier and a timestamp of a last update.

5. The method of claim 1, wherein the business objects comprise customer business objects, employee business objects, vendor business objects, and financial institution business objects.

6. The method of claim 1, wherein the files are not homogenous with respect to business object content.

7. The method of claim 1, wherein the update message comprises a single notification for all updates associated with a same customer account.

8. A computing apparatus comprising:
    a processor; and
    a memory storing instructions that, when executed by the processor, configure the apparatus to:
        request update information for multiple files on a legacy database for a specified time range, wherein the legacy database is operating in parallel with a modern database in parallel;
        receive item keys for items that were updated within the multiple files during the specified time range;
        filter each of the item keys based at least on their associated business item and generate an update message by combining item keys from across the multiple files that correspond with a same business object and ignoring item keys associated with the same business object;
        send the update message to the modern database; and
        based on the update message, perform data validation at the modern database to determine the updated item keys for the multiple files on the legacy database are captured on the modern database operating in parallel.

9. The computing apparatus of claim 8, wherein the legacy database is a Pick environment and the modern database is a modern microservice architecture.

10. The computing apparatus of claim 8, wherein additional update messages are generated for additional business objects, and wherein each update message comprises all of the item keys associated with a corresponding business object during the specified time range.

11. The computing apparatus of claim 8, wherein the item keys comprise an item identifier and a timestamp of a last update.

12. The computing apparatus of claim 8, wherein the business objects comprise customer business objects, employee business objects, vendor business objects, and financial institution business objects.

13. The computing apparatus of claim 8, wherein the files are not homogenous with respect to business object content.

14. The computing apparatus of claim 8, wherein the update message comprises a single notification for all updates associated with a same customer account.

15. A non-transitory computer-readable storage medium, the computer-readable storage medium including instructions that when executed by a computer, cause the computer to:
request update information for multiple files on a legacy database for a specified time range, wherein the legacy database is operating in parallel with a modern database in parallel;
receive item keys for items that were updated within the multiple files during the specified time range;
filter each of the item keys based at least on their associated business item and generate an update message by combining item keys from across the multiple files that correspond with a same business object and ignoring item keys associated with the same business object;
send the update message to the modern database; and
based on receipt of the update message, perform data validation at the modern database comprising determining updated item keys for the multiple files on the legacy database are captured on the modern database operating in parallel.

16. The computer-readable storage medium of claim 15, wherein the legacy database is a Pick environment and the modern database is a modern microservice architecture.

17. The computer-readable storage medium of claim 15, wherein additional update messages are generated for additional business objects, and wherein each update message comprises all of the item keys associated with a corresponding business object during the specified time range.

18. The computer-readable storage medium of claim 15, wherein the item keys comprise an item identifier and a timestamp of a last update.

19. The computer-readable storage medium of claim 15, wherein the files are not homogenous with respect to business object content.

20. The computer-readable storage medium of claim 15, wherein the update message comprises a single notification for all updates associated with a same customer account.

* * * * *